(12) United States Patent
Chua et al.

(10) Patent No.: US 7,481,562 B2
(45) Date of Patent: Jan. 27, 2009

(54) DEVICE AND METHOD FOR PROVIDING ILLUMINATING LIGHT USING QUANTUM DOTS

(75) Inventors: Janet Bee Yin Chua, Perak (MY); Kok Chin Pan, Penang (MY); Kee Yean Ng, Penang (MY); Kheng Leng Tan, Penang (MY); Tajul Arosh Baroky, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 436 days.

(21) Appl. No.: 10/992,142

(22) Filed: Nov. 18, 2004

(65) Prior Publication Data

US 2006/0103589 A1 May 18, 2006

(51) Int. Cl.
*F21V 7/04* (2006.01)
(52) U.S. Cl. .................. 362/612; 362/84; 362/607; 362/339
(58) Field of Classification Search .......... 362/612, 362/606, 608, 629, 84, 339, 614, 620, 626; 349/71

See application file for complete search history.

(56) References Cited

U.S. PATENT DOCUMENTS

| | | | |
|---|---|---|---|
| 6,585,939 B1 * | 7/2003 | Dapprich | 422/99 |
| 6,613,247 B1 | 9/2003 | Hohn et al. | |
| 6,637,905 B1 | 10/2003 | Ng et al. | |
| 6,744,960 B2 * | 6/2004 | Pelka | 385/130 |
| 7,157,839 B2 * | 1/2007 | Ouderkirk et al. | 313/111 |
| 2004/0252488 A1 * | 12/2004 | Thurk | 362/147 |
| 2006/0002141 A1 * | 1/2006 | Ouderkirk et al. | 362/609 |
| 2006/0082679 A1 * | 4/2006 | Chua et al. | 348/371 |
| 2007/0053208 A1 * | 3/2007 | Justel et al. | 362/629 |

FOREIGN PATENT DOCUMENTS

EP  1045458 A2  7/1997

* cited by examiner

*Primary Examiner*—Ali Alavi
*Assistant Examiner*—Evan Dzierzynski

(57) ABSTRACT

A device and method for providing illuminating light utilizes quantum dots to convert at least some of the original light emitted from a light source of the device to longer wavelength light to change the color characteristics of the illuminating light. The quantum dots may be included in the light source, a light panel and/or an optional interface medium of the device.

17 Claims, 5 Drawing Sheets

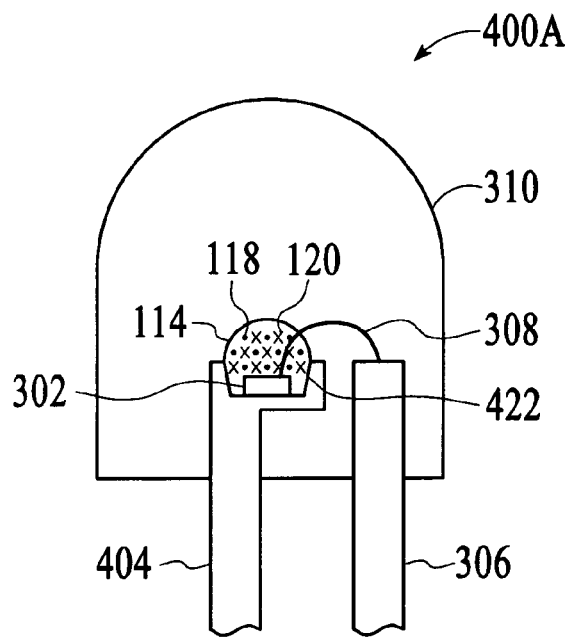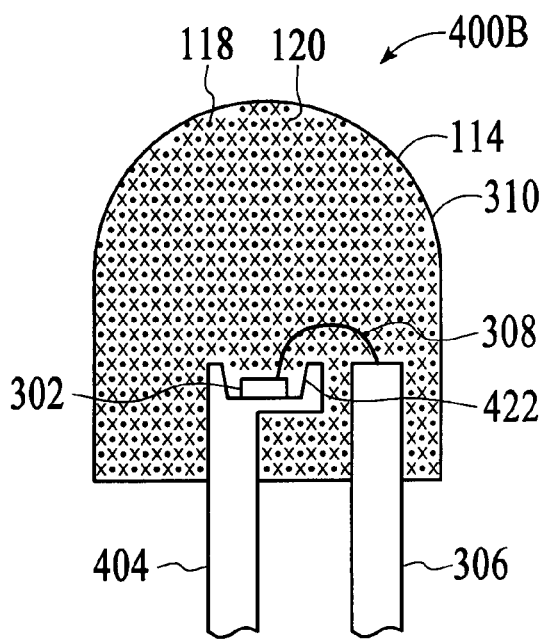
FIG.4A　　　　FIG.4B
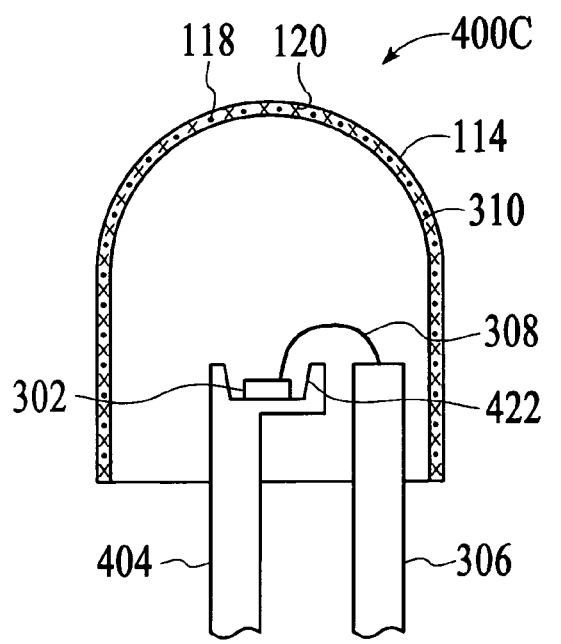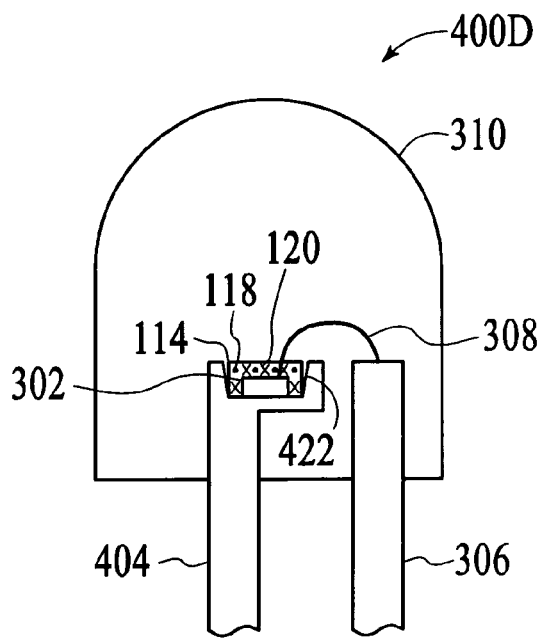
FIG.4C　　　　FIG.4D

US 7,481,562 B2

DEVICE AND METHOD FOR PROVIDING ILLUMINATING LIGHT USING QUANTUM DOTS

BACKGROUND OF THE INVENTION

Liquid crystal displays (LCDs) require an external illumination source such as a backlighting device since the LCDs do not themselves emit light. Traditional backlighting devices include a narrow fluorescent tube that serves as a light source to input "white" color light into one of the sides of a light guide panel (also known as "light pipe panel"), which is positioned behind a LCD. The light from the fluorescent tube is internally reflected in the light guide panel and selectively emitted from the top surface of the wave guide panel toward the LCD, providing illuminating light for the LCD With technological advancements in light emitting diodes (LEDs), the fluorescent tubes in traditional backlight devices are being replaced with LEDs. Some of the advantages of LEDs over fluorescent tubes include longer operating life, lower power consumption, and smaller in size. However, LEDs generally have narrow emission spectrum (approximately +/−10 nm). As an example, a blue InGaN LED may generate light with wavelength of 470 nm +/−10 nm. As another example, a green InGaN LED may generate light with wavelength of 510 nm +/−10 nm. As another example, a red AlInGaP LED may generate light with wavelength of 630 nm +/−10 nm. Due to the narrow-band emission characteristics, different emission types of monochromatic LEDs (e.g., red, green and blue LEDs) must be used together in a backlighting device to provide the white color illuminating light for a LCD. Alternatively, the original light emitted from monochromatic LEDs must be partially or almost completely converted to different wavelength light through photoluminescence, e.g., fluorescence, to provide the white color illuminating light.

Between these two approaches for producing white color illuminating light using monochromatic LEDs, the latter approach is generally preferred over the former approach. In contrast to the latter approach of using photoluminescence, the former approach of using different emission types of LEDs requires a more complex driving circuitry since the different emission types of LEDs have different operating voltage requirements. In addition, different emission types of LEDs tend to degrade differently over their operating lifetime, which makes color control over an extended period difficult using this approach.

A concern with the latter approach of using photoluminescence is that many of the phosphors that are currently available to produce white color illuminating light result in output light having lower-than-optimal Color Rendering Index (CRI).

In view of this concern, there is a need for a device and method for providing white color illuminating light using photoluminescence that can potentially increase the CRI of the illuminating light.

SUMMARY OF THE INVENTION

A device and method for providing illuminating light utilizes quantum dots to convert at least some of the original light emitted from a light source of the device to longer wavelength light to change the color characteristics of the illuminating light. The quantum dots may be included in the light source, a light panel and/or an optional interface medium of the device.

A device for providing illuminating light in accordance with an embodiment of the invention comprises a light source that generates original light, a light panel optically coupled to the light source so that the light panel produces the illuminating light, which is derived from the original light, and a wavelength-shifting region optically coupled to the light source to receive the original light. The wavelength-shifting region includes at least one type of quantum dots to at least convert some of the original light to converted light, which is a component of the illuminating light.

A method for providing illuminating light in accordance with an embodiment of the invention comprises generating original light, receiving the original light, including converting at least some of the original light to converted light using at least one type of quantum dots, and transmitting one of the original light and the converted light into a light panel to produce the illuminating light. The converted light is a component of the illuminating light.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 4A, 4B, 4C and 4D are diagrams of LEDs with different configurations of the wavelength-shifting region and a leadframe having a reflector cup in accordance with embodiments of the invention.

DETAILED DESCRIPTION

Figure 1:
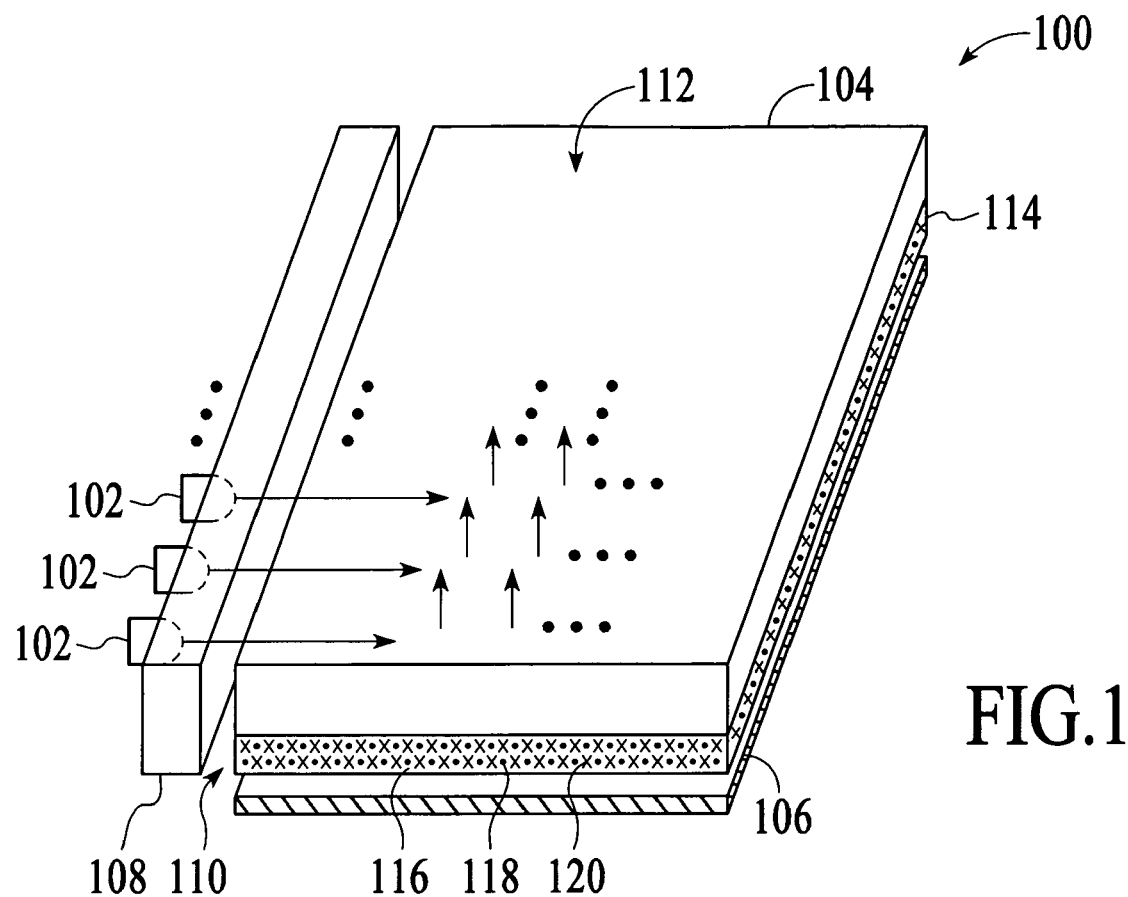
FIG. 1 is a perspective view of an illumination device in accordance with an embodiment of the invention.

With reference to FIG. 1, an illumination device 100 in accordance with an embodiment of the invention is described. The illumination device 100 can serve as a backlighting device for a display device that requires external illumination, such as a liquid crystal display (LCD). As described in more detail below, the illumination device 100 utilizes at least one type of quantum dots to provide illuminating light of desired color characteristics through photoluminescence, for example, "white" color illuminating light. The illumination device 100 may also utilize one or more non-quantum fluorescent materials to take advantage of emission characteristics of the fluorescent materials along with the quantum dots to produce illuminating light with increased Color Rendering Index (CRI).

As shown in FIG. 1, the illumination device 100 includes a number of light emitting devices 102, a light panel 104, a reflector 106 and an optional interface medium 108. The light emitting devices 102 serve as light sources for the illumination device 100. Although only three light emitting devices are shown in FIG. 1, the illumination device 100 may include any number of light emitting devices. Each light emitting device 102 can be any type of device that generates light, such as a light emitting diode (LEDs) or a laser diode. As an example, the light emitting devices 102 may be devices that generate ultraviolet (UV) or blue original (non-converted) light having a peak wavelength between approximately 200 nm to 500 nm. The light emitting devices 102 may include the same type of light emitting devices so that each light emitting device generates the same original light. As an example, each of the light emitting devices 102 may be an LED that generates original light having a peak wavelength of approximately 480 nm. Alternatively, the light emitting devices 102 may include one or more different types of light emitting devices so that some of the light emitting devices may generate different original light from other light emitting devices.

As illustrated in FIG. 1, the light emitting devices 102 are positioned along one side of the light panel 104. Thus, the output light from the light emitting devices 102 is transmitted into the light panel 104 through the side 110 of the light panel 104 facing the light emitting devices 102. In other embodiments, the light emitting devices 102 may be positioned along more than one side of the light panel 104.

The light panel 104 serves to direct the light received at the side 110 of the light panel from the light emitting devices 102 toward the upper surface 112 of the light panel so that illuminating light is emitted from the upper surface of light panel in a substantially uniform manner. In an exemplary embodiment, the light panel 104 is a light guide panel (also known as "light pipe panel"). Thus, the light panel 104 will be referred to herein as the light guide panel. However, in other embodiments, the light panel 104 may be any optically transparent panel that can emit illuminating light from a wide surface of the panel using light from one or more light sources.

Figure 2:
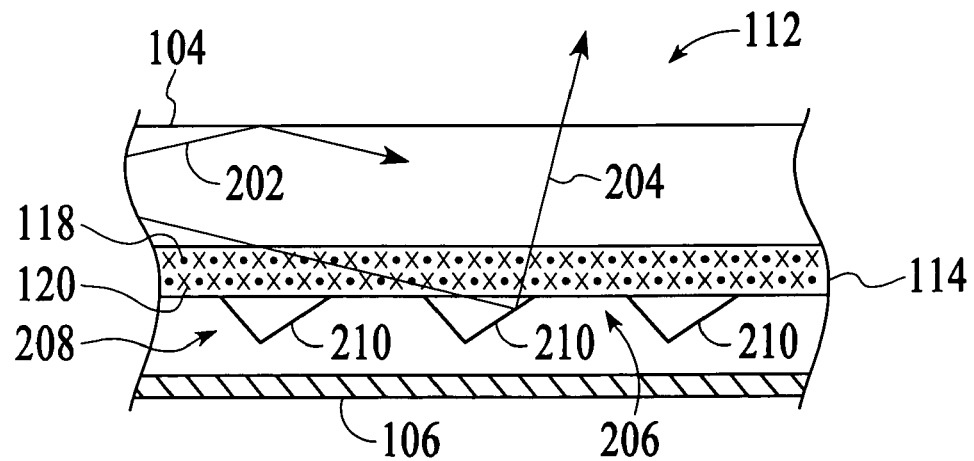
FIG. 2 is a partial cross-sectional view of a light panel and a reflector of the illumination device in accordance with an embodiment of the invention.

As illustrated in FIG. 2, the light guide panel 104 is designed such that light that is internally incident on the upper surface 112 of the light guide panel at large angles with respect to normal, as illustrated by the arrow 202, is internally reflected, while light that is internally incident on the upper surface at smaller angles, as illustrated by the arrow 204, is transmitted through the upper surface of the light guide panel. The light guide panel 104 may include a light extraction feature 208 to diffuse and scatter the light within the light guide panel so that light is emitted from the upper surface 112 of the light guide panel more uniformly. The light extraction feature 208 may be printed, chemical-etched or laser-etched dots on the bottom surface 206 of the light guide panel 104. Alternatively, the light extraction feature 208 may be a microstructured lens feature, as illustrated in FIG. 2, formed on the bottom surface 206 of the light guide panel 104. As shown in FIG. 2, the microstructured lens feature 208 includes many protrusions 210, which may have V-shaped cross-sectional profiles, that optimize angles of reflected or refracted light so that light can be extracted more uniformly from the upper surface 112 of the light guide panel 104.

As shown in both FIGS. 1 and 2, the reflector 106 is positioned below the light guide panel 104. The reflector 106 serves to reflect light emitted out of the bottom surface 206 of the light guide panel 104 back into the light guide panel so that the light may be emitted from the upper surface 112 of the light guide panel.

As shown in FIG. 1, the optional interface medium 108 is positioned adjacent to the side 110 of light guide panel 104 between the light emitting devices 102 and the light guide panel. The interface medium 108 is made of an optically transparent material, such as plastic or glass material, so that light from the light emitting devices 102 is transmitted into the side 110 of the light guide panel 104 through the interface medium. The interface medium 108 may be configured to disperse the light from the light emitting devices 102 along the length of the side 110 of the light guide panel 104 so that the light from the light emitting devices 102 is distributed along the entire side 110 of the light guide panel.

As illustrated in FIGS. 1 and 2, the illumination device 100 further includes a wavelength-shifting region 114, which is located within the light guide panel 104. However, in other embodiments of the invention, the wavelength-shifting region 114 may be located within one or more of the light emitting devices 102, within the light guide panel 104 and/or within the optional interface medium 108, as described in more detail below. The wavelength-shifting region 114 includes photoluminescent material that converts some or virtually all of the original light emitted from one or more of the light emitting devices 102 to longer wavelength light. The wavelength-shifting region 114 includes a transparent host matrix 116, which may be polymer (formed from liquid or semisolid precursor material such as monomer), epoxy, silicone, glass or a hybrid of silicone and epoxy. The photoluminescent material of the wavelength-shifting region 114 includes quantum dots 118 and may also include non-quantum fluorescent material 120. The quantum dots 118 converts at least some of the original light generated by the light emitting devices 102 to converted light, which is eventually emitted out of the light guide panel 104 as a component of the illuminating light provided by the device 100. Similarly, the non-quantum fluorescent material 120 converts at least some of the original light generated by the light emitting devices 102 to another converted light, which is again eventually emitted out of the light guide panel 104 as another component of the illuminating light provided by the device 100. Thus, the illuminating light is derived from the original light generated by the light emitting devices 102.

The non-quantum fluorescent material 120, which may be included in the wavelength-shifting region 114, may be one or more types of non-quantum phosphors, such as Garnet-based phosphors, Silicate-based phosphors, Orthosilicate-based phosphors, Thiogallate-based phosphors, Sulfide-based phosphors and Nitride-based phosphors. The non-quantum phosphors may be phosphor particles with or without a silica coating. Silica coating on phosphor particles reduces clustering or agglomeration of phosphor particles when the phosphor particles are mixed with the host matrix to form the wavelength-shifting region 114. Clustering or agglomeration of phosphor particles may produce illuminating light having a non-uniform color distribution.

The silica coating may be applied to synthesized phosphor particles by subjecting the phosphor particles to an annealing process to anneal the phosphor particles and to remove contaminants. The phosphor particles are then mixed with silica powders, and heated in a furnace at approximately 200 degrees Celsius. The applied heat forms a thin silica coating on the phosphor particles. The amount of silica on the phosphor particles may be approximately 1% with respect to the phosphor particles. Alternatively, the silica coating can be formed on phosphor particles without applying heat. Rather, silica powder can be added to the phosphor particles, which adheres to the phosphor particles due to Van der Waals forces to form a silica coating on the phosphor particles.

The non-quantum fluorescent material 120 may alternatively include one or more organic dyes or any combination of non-quantum phosphors and organic dyes.

The quantum dots 118, also known as semiconductor nanocrystals, included in the wavelength-shifting region 114 are artificially fabricated devices that confine electrons and holes. Typical dimensions of quantum dots range from nanometers to few microns. Quantum dots have a photoluminescent property to absorb light and re-emit different wavelength light, similar to phosphor particles. However, the color characteristics of emitted light from quantum dots depend on the size of the quantum dots and the chemical composition of the quantum dots, rather than just chemical composition as phosphor particles. Quantum dots are characterized by a bandgap smaller than the energy of at least a portion of the original light emitted from one or more of the light emitting devices 102.

The quantum dots 118 included in the wavelength-shifting region 114 may be quantum dots made of CdS, CdSe, CdTe, CdPo, ZnS, ZnSe, ZnTe, ZnPo, MgS, MgSe, MgTe, PbSe, PbS, PbTe, HgS, HgSe, HgTe and $Cd(S_{1-x}Se_x)$, or made from a metal oxides group, which consists of $BaTiO_3$, $PbZrO_3$, $PbZr_zTi_{1-z}O_3$, $Ba_xSr_{1-x}TiO_3$, $SrTiO_3$, $LaMnO_3$, $CaMnO_3$, $La_{1-x}Ca_xMnO_3$. The wavelength-shifting region 114 includes at least one type of quantum dots with respect to chemical composition and size. The type(s) of quantum dots included in the wavelength-shifting region 114 may partly depend on the wavelength deficiencies of the non-quantum fluorescent material 120. As an example, if the non-quantum fluorescent material 120 produces an output light that is deficient at around 600 nm, then a particular type of quantum dots can be selected that can produce converted light at around 600 nm to compensate for the deficiency, which will increase the CRI of the illuminating light provided by the device 100. The quantum dots 118 included in the wavelength-shifting region 114 may or may not be coated with a material having an affinity for the host matrix. The coating passivates the quantum dots 118 to prevent agglomeration or aggregation to overcome the Van der Waals binding force between the quantum dots.

The coating on the quantum dots 118 can be (a) organic caps, (b) shells or (c) caps made of glass material, such as Si nanocrystals. Organic caps can be formed on quantum dots using $Ag_2S$ and $Cd(OH)_2$, which may preferably be passivated with $Cd^{2+}$ at high pH. A surface modification of the quantum dots is then performed by attaching dyes to the surface of the quantum dots. As an example, CdSe surface surfactant is labile and can be replaced by sequential addition of $Se^+$ and $Cd^{2+}$, which can grow to make a seed (quantum dot) larger. For $Cd^{2+}$ rich surface, the surface can be treated with $Ph-Se^-$ and an organic coating is covalently linked to the surface. This isolation of molecular particles is referred to as "capped". Type of known capping molecules include Michelle liquids (Fendler), Tio-terminations (S-based) (Weller-Hamburg), Phosphate termination (Berwandi-MIT), Nitrogen termination (pyridine, pyrazine) and Dendron caps (multi-stranded ligands) (Peng).

Shells are coatings on inner core material (quantum dots). Generally, coating material that forms the shells can be oxide or sulfide based. Examples of shell/core are $TiO_2/Cds$, $ZnO/CdSe$, $ZnS/Cds$ and $SnO_2/CdSe$. For CdSe core, it can also be coated with ZnS, ZnSe (selenide based) or CdS, which improves the efficiency of the CdSe dramatically.

The wavelength-shifting region 114 may include dispersant or diffusing particles that are distributed throughout the region. The diffusing particles may be silica, silicon dioxide, aluminum oxide, barium titanate, and/or titanium oxide. The wavelength-shifting region 114 may also include adhesion promoter and/or ultraviolet (UV) inhibitor.

Figure 3A:
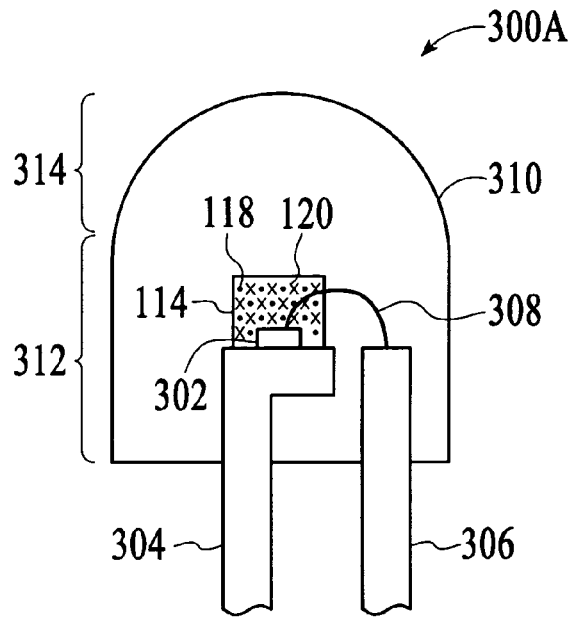
FIGS. 3A, 3B, 3C and 3D are diagrams of LEDs with different configurations of a wavelength-shifting region in accordance with embodiments of the invention.

In some embodiments of the invention, the wavelength-shifting region 114 may be incorporated into one or more of the light emitting devices 102, which may be LEDs, as illustrated in FIGS. 3A, 3B, 3C and 3D. In FIG. 3A, an LED 300A that includes the wavelength-shifting region 114 in accordance with an embodiment of the invention is shown. The LED 300A is a leadframe-mounted LED. The LED 300A includes an LED die 302, leadframes 304 and 306, a wire 308 and a lamp 310. The LED die 302 is a semiconductor chip that generates light of a particular peak wavelength. Thus, the LED die 302 is the light source for the LED 300A. Although the LED 300A is shown in FIG. 3A as including a single LED die, the LED may include multiple LED dies. The LED die 302 may be designed to generate light having a peak wavelength in the UV or blue wavelength range. The LED die 302 is situated on the leadframe 304 and is electrically connected to the other leadframe 306 via the wire 308. The leadframes 304 and 306 provide the electrical power needed to drive the LED die 302. The LED die 302 is encapsulated in the lamp 310, which is a medium for the propagation of light from the LED die 302. The lamp 310 includes a main section 312 and an output section 314. In this embodiment, the output section 314 of the lamp 310 is dome-shaped to function as a lens. Thus, the light emitted from the LED 300A as output light is focused by the dome-shaped output section 314 of the lamp 310. However, in other embodiments, the output section 314 of the lamp 310 may be horizontally planar.

The lamp 310 of the LED 300A is made of a transparent host matrix so that light from the LED die 302 can travel through the lamp and be emitted out of the output section 314 of the lamp. The host matrix may be polymer (formed from liquid or semisolid precursor material such as monomer), epoxy, silicone, glass or a hybrid of silicone and epoxy. In this embodiment, the lamp 310 includes the wavelength-shifting region 114, which is positioned around the LED die 302. Although the wavelength-shifting region 114 of the lamp 310 is shown in FIG. 3A as being rectangular in shape, the wavelength-shifting region may be configured in other shapes, such as a hemisphere, as shown in FIG. 4A. Furthermore, in other embodiments, the wavelength-shifting region 114 may not be physically coupled to the LED die 302. Thus, in these embodiments, the wavelength-shifting region 114 may be positioned elsewhere within the lamp 310.

Figure 3B:
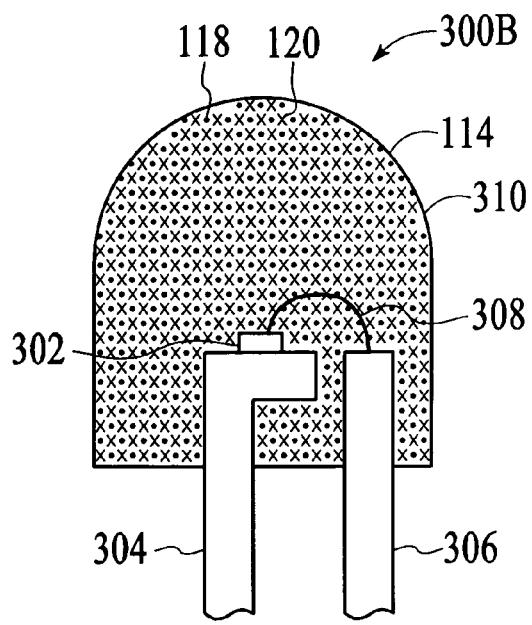
Figure 3C:
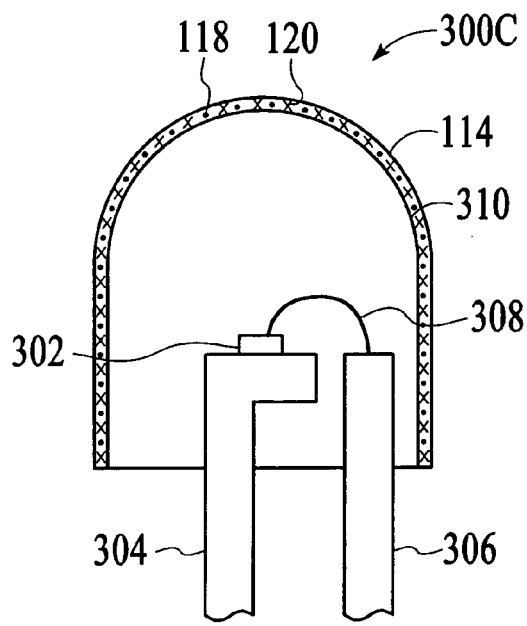
Figure 3D:
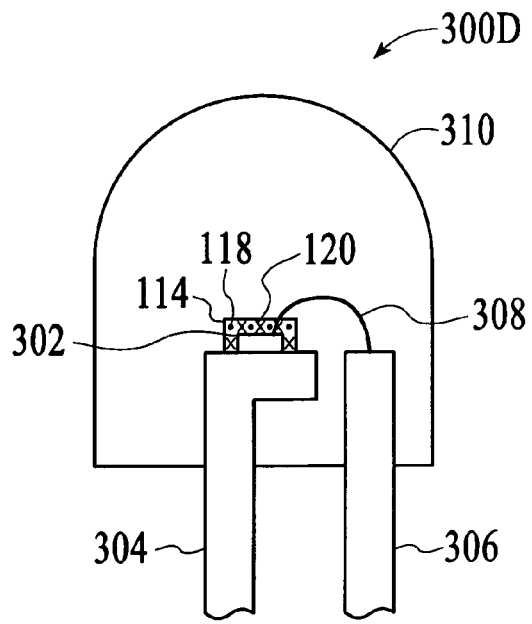

In FIGS. 3B, 3C and 3D, LEDs 300B, 300C and 300D with alternative configurations for the wavelength-shifting region 114 in accordance with other embodiments of the invention are shown. In the LED 300B of FIG. 3B, the wavelength-shifting region 114 fills the entire lamp 310. Thus, the entire lamp 310 of the LED 300B is the wavelength-shifting region 114. In the LED 300C of FIG. 3C, the wavelength-shifting region 114 is located at the outer surface of the lamp 310. In the LED 300D of FIG. 3D, the wavelength-shifting region 114 is a thin layer coated over the LED die 302. As an example, the thickness of the wavelength-shifting region 114 in the LED 300D can be between ten (10) and sixty (60) microns.

In alternative embodiments, the leadframe of an LED on which the LED die is positioned may include a reflector cup, as illustrated in FIGS. 4A, 4B, 4C and 4D. FIGS. 4A-4D show LEDs 400A, 400B, 400C and 400D with different configurations for the wavelength-shifting region 114 and a leadframe 404 having a reflector cup 422. The reflector cup 422 provides a depressed region for the LED die 302 to be positioned so that some of the light generated by the LED die is reflected away from the leadframe 404 to be emitted from the respective LED as useful output light.

Figure 5A:
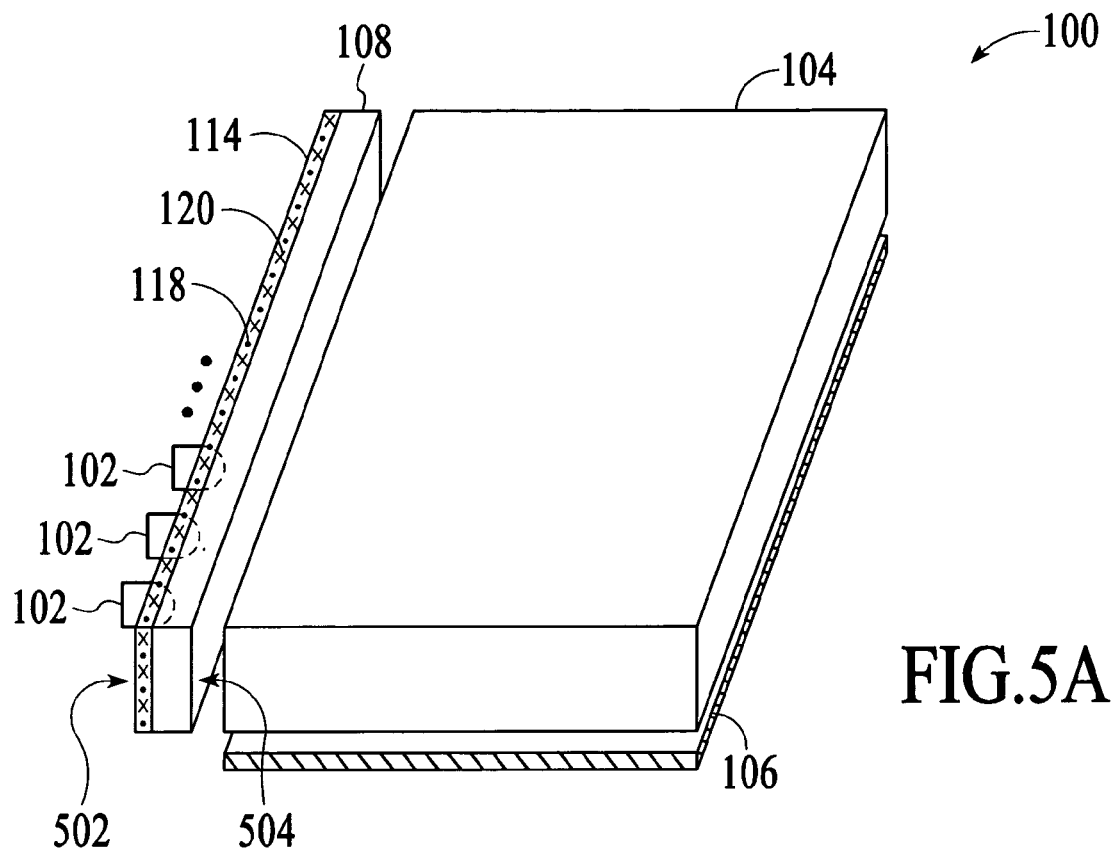
FIG. 5A is a perspective view of the illumination device with the wavelength-shifting region being positioned within an optional interface medium in accordance with an embodiment of the invention.
Figure 5B:
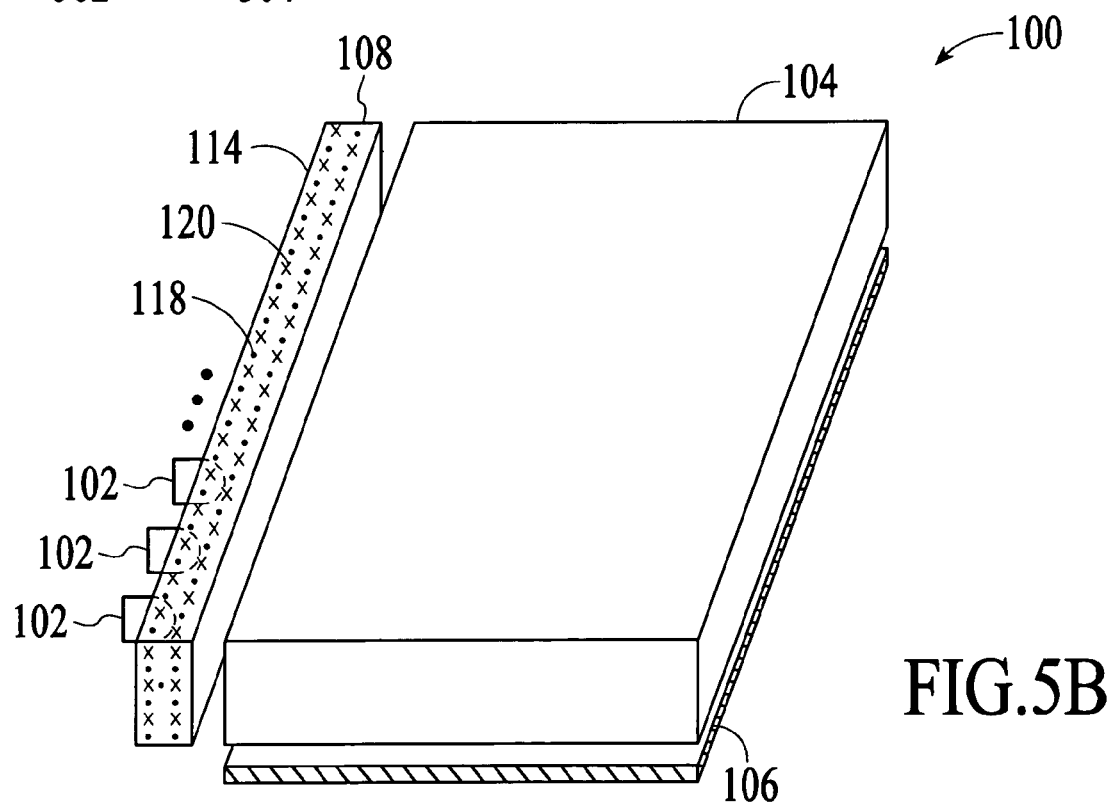
FIG. 5B is a perspective view of the illumination device with the wavelength-shifting region being positioned within an optional interface medium in accordance with another embodiment of the invention.

As mentioned above, in other embodiments of the invention, the wavelength-shifting region 114 may be incorporated into the optional interface medium 108, as illustrated in FIGS. 5A and 5B. In FIG. 5A, the wavelength-shifting region 114 is located within the optional interface medium 108 at a major surface 502 that faces the light emitting devices 102. In an alternative configuration, the wavelength-shifting region 114 may be located within the optional interface medium 108 at the other major surface 504 that faces the light guide panel 104 or at a location between the major surfaces 502 and 504. In FIG. 5B, the wavelength-shifting region 114 fills the entire optional interface medium 108. Thus, in this embodiment, the entire interface medium 108 is the wavelength-shifting region 114.

Figure 6A:
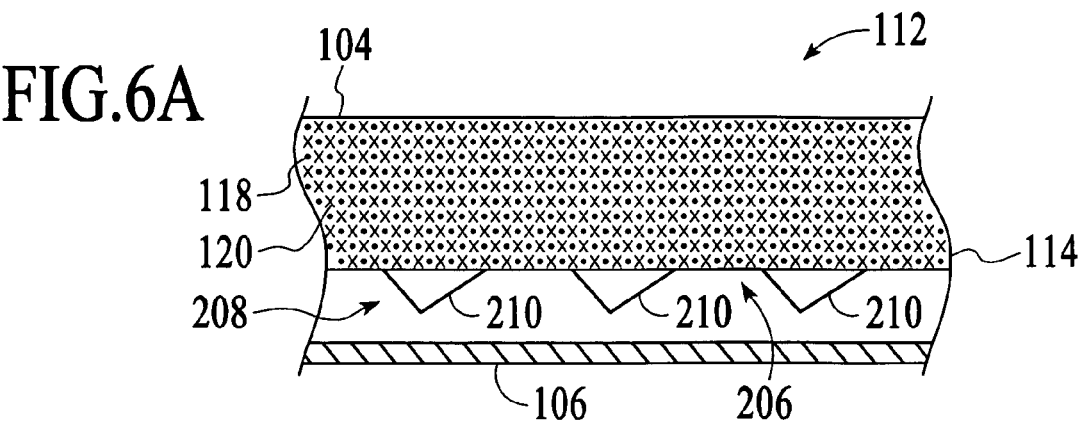
FIG. 6A is a partial cross-sectional view of the light panel and the reflector of the illumination device in which the wavelength-shifting region is positioned within the light panel in accordance with an embodiment of the invention.
Figure 6B:
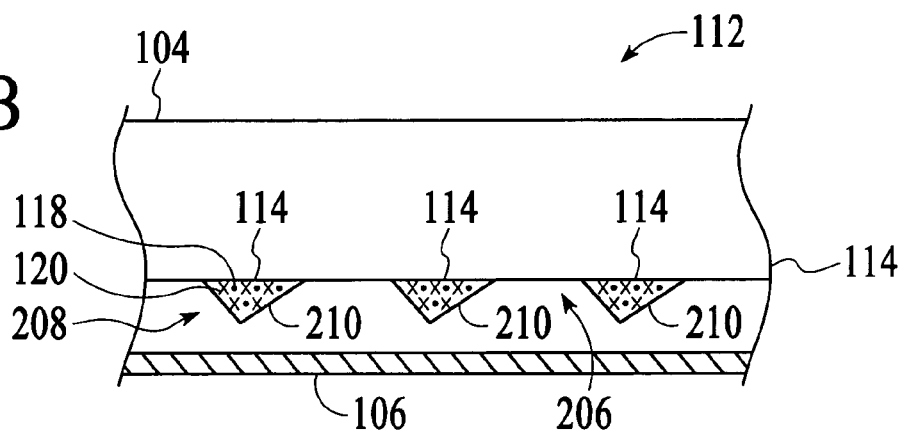
FIG. 6B is a partial cross-sectional view of the light panel and the reflector of the illumination device in which the wavelength-shifting region is positioned within the light panel in accordance with another embodiment of the invention.

In other embodiments of the invention, the wavelength-shifting region 114 may be incorporated into the light guide panel 104, as illustrated in FIGS. 2, 6A, 6B and 6C. In FIG. 2, the wavelength-shifting region 114 is located within the light guide panel 104 at the bottom surface 206. In an alternative configuration, the wavelength-shifting region 114 may be located within the light guide panel 104 at the upper surface 112 or at a location between the upper and lower surfaces 112 and 206. In FIG. 6A, the wavelength-shifting region 114 fills the entire light guide panel 104. Thus, in this embodiment, the entire light guide panel 104 is the wavelength-shifting region 114. In FIG. 6B, the wavelength-shifting region 114 is located within the microstructured lens feature 208 of the wavelength-shifting region. Alternatively, the wavelength-shifting region 114 may be included in parts of the protrusions 210 of the microstructured lens feature 208 of the wavelength-shifting region, such as at the surfaces of the microstructured lens feature.

Figure 7:
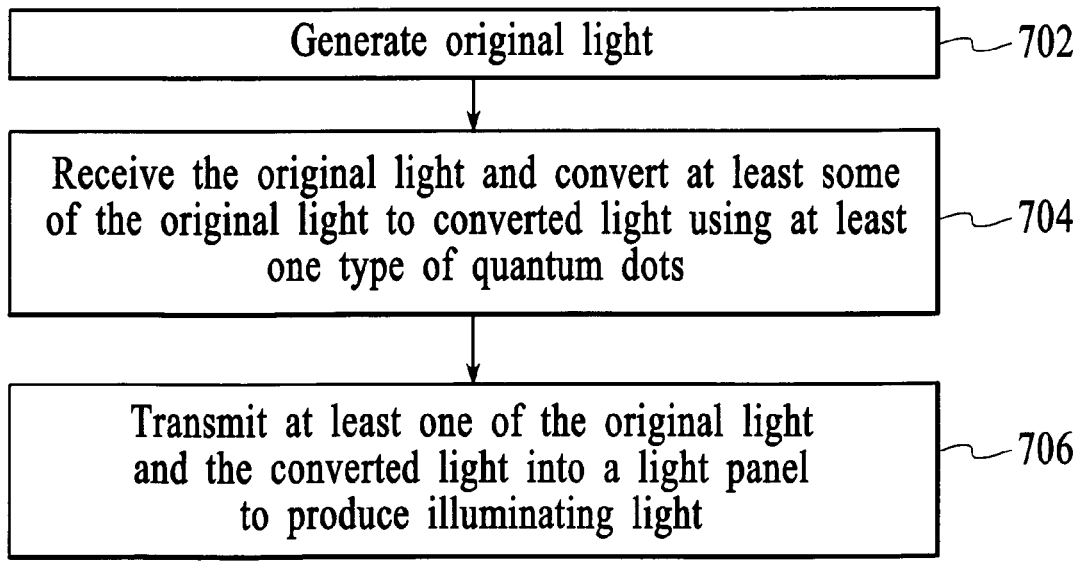
FIG. 7 is a flow diagram of a method for emitting output light in accordance with an embodiment of the invention.

A method for providing illuminating light in accordance with an embodiment of the invention is described with reference to FIG. 7. At block 702, original light is generated. The original light may be generated by one or more light sources that each includes one or more LED dies. Next, at block 704, the original light is received and at least some of the original light is converted to converted light using at least one type of quantum dots. Next, at block 706, at least one of the original light and the converted light is transmitted into a light panel to produce illuminating light, which includes the converted light as a component.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device for providing illuminating light, said device comprising:
    a light source that generates original light;
    a light panel optically coupled to said light source so that said light panel produces said illuminating light, said illuminating light being derived from said original light; and
    a wavelength-shifting region optically coupled to said light source,
    said wavelength-shifting region including at least one type of quantum dots to at least convert some of said original light to converted light, said converted light being a component of said illuminating light,
    wherein said light panel includes a microstructured lens feature located on a bottom surface of said light panel, said wavelength-shifting region being located within said microstructured lens feature, wherein said microstructured lens feature includes a plurality of protrusions having V-shaped cross-sectional profiles, said wavelength-shifting region being located within the protrusions of said microstructured lens feature.

2. The device of claim 1 wherein said light source is a light-emitting diode (LED) having an LED die.

3. The device of claim 1 wherein said wavelength-shifting region includes non-quantum fluorescent material to converts some of said original light to second converted light, said second converted light being another component of said illuminating light.

4. The device of claim 1 wherein said quantum dots have a coating of selected material.

5. The device of claim 4 wherein said coating of said quantum dots includes organic caps, quantum dot shells or caps made of glass material.

6. The device of claim 1 wherein said quantum dots includes one of CdS, CdSe, CdTe, CdPo, ZnS, ZnSe, ZnTe, ZnPo, MgS, MgSe, MgTe, PbSe, PbS, PbTe, HgS, HgSe, HgTe, $Cd(S_{1-x}Se_x)$, $BaTiO_3$, $PbZrO_3$, $PbZr_zTi_{1-z}O_3$, $Ba_xSr_{1-x}TiO_3$, $SrTiO_3$, $LaMnO_3$, $CaMnO_3$ and $La_{1-x}Ca_xMnO_3$.

7. The device of claim 1 wherein said wavelength-shifting region includes silicone, glass, epoxy or a hybrid material of silicone and epoxy.

8. A method for providing illuminating light, said method comprising:
    generating original light at a light source; receiving said original light, including converting at least some of said original light to converted light using at least one type of quantum dots; and transmitting one of said original light and said converted light into a light panel to produce said illuminating light, said converted light being a component of said illuminating light, wherein said receiving and said converting are performed at a microstructured lens feature located on a bottom surface of said light panel said interface medium being external to said light source, wherein said microstructured lens feature includes a plurality of protrusions having V-shaped cross-sectional profiles, said wavelength-shifting region being located within the protrusions of said microstructured lens feature.

9. The method of claim 8 wherein said light source is a light-emitting diode (LED) having an LED die.

10. The method of claim 8 wherein said receiving further includes converting some of said original light to second converted light using non-quantum fluorescent material, said second converted light being another component of said illuminating light.

11. A device for providing illuminating light, said device comprising:
    a light source that emits original light; and being derived from said original light; a wavelength-shifting region optically coupled to said light source, said wavelength-shifting region including at least one type of quantum dots to at least convert some of said original light to converted light, said converted light being a component of said illuminating light; and an interface medium positioned between said light source and said light guide panel, said interface medium being external to said light source, said wavelength-shifting region is located within said interface medium, wherein said panel has a microstructured lens feature located on a bottom surface of said light panel, wherein said microstructured lens feature includes a plurality of protrusions having V-shaped cross-sectional profiles, said wavelength-shifting region being located within the protrusions of said microstructured lens feature.

12. The device of claim 11 wherein said light source is a light-emitting diode (LED) having an LED die.

13. The device of claim 11 wherein said wavelength-shifting region includes non-quantum fluorescent material to converts some of said original light to second converted light, said second converted light being another component of said illuminating light.

14. The device of claim 11 wherein said quantum dots have a coating of selected material.

15. The device of claim 14 wherein said coating of said quantum dots includes organic caps, quantum dot shells or caps made of glass material.

16. The device of claim 11 wherein said quantum dots includes one of CdS, CdSe, CdTe, CdPo, ZnS, ZnSe, ZnTe, ZnPo, MgS, MgSe, MgTe, PbSe, PbS, PbTe, HgS, HgSe, HgTe, $Cd(S_{1-x}Se_x)$, $BaTiO_3$, $PbZrO_3$, $PbZr_zTi_{1-z}O_3$, $Ba_xSr_{1-x}TiO_3$, $SrTiO_3$, $LaMnO_3$, $CaMnO_3$ and $La_{1-x}Ca_xMnO_3$.

17. The device of claim 11 wherein said wavelength-shifting region includes silicone, glass, epoxy or a hybrid material of silicone and epoxy.

* * * * *